United States Patent
Barillot et al.

(10) Patent No.: US 10,962,102 B2
(45) Date of Patent: Mar. 30, 2021

(54) SUPPORTING DEVICE FOR A BEARING MOUNTED ON A DIFFERENTIAL HOUSING

(71) Applicant: VOLVO TRUCK CORPORATION, Gothenburg (SE)

(72) Inventors: Thomas Barillot, Mornant (FR); Serge Vananty, Chassieu (FR); Yann Depoorter, Saint Alban Leysse (FR); Chris Clezardin, Saint Maurice sur Dargoire (FR); Michael Joliet, Montseveroux (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 85 days.

(21) Appl. No.: 15/748,410

(22) PCT Filed: Jul. 31, 2015

(86) PCT No.: PCT/IB2015/001769
§ 371 (c)(1),
(2) Date: Jan. 29, 2018

(87) PCT Pub. No.: WO2017/021750
PCT Pub. Date: Feb. 9, 2017

(65) Prior Publication Data
US 2018/0216723 A1 Aug. 2, 2018

(51) Int. Cl.
*F16H 57/04* (2010.01)
(52) U.S. Cl.
CPC ..... *F16H 57/0409* (2013.01); *F16H 57/0423* (2013.01); *F16H 57/0427* (2013.01); *F16H 57/0457* (2013.01); *F16H 57/0471* (2013.01)

(58) Field of Classification Search
CPC .......................... F16H 57/0423; F16H 57/037
See application file for complete search history.

(56) References Cited

U.S. PATENT DOCUMENTS 1,944,612 A * 1/1934 Repeck ................. F16H 57/037
475/246
2,015,108 A * 9/1935 Harper ................ F16H 57/0483
184/11.1
(Continued)

FOREIGN PATENT DOCUMENTS

| EP | 2230423 A1 | 9/2010 |
| GB | 2202010 A | 9/1988 |
| WO | 2013039396 A1 | 3/2013 |

OTHER PUBLICATIONS

International Search Report (dated Feb. 12, 2016) for corresponding International App. PCT/IB2015/001769.

*Primary Examiner* — Sherry L Estremsky
(74) *Attorney, Agent, or Firm* — Venable LLP; Jeffri A. Kaminski

(57) ABSTRACT

A supporting device to be secured in a housing of an axle unit includes a main portion in the shape of a ring having a longitudinal axis and forming a circular opening intended to receive an outer ring of a bearing which, in use, is mounted on a differential housing. The supporting device further includes a collector capable of collecting lubricant projected inside the housing by at least one rotating part, in use, the collector including an outlet port for allowing lubricant to flow towards the longitudinal axis.

20 Claims, 5 Drawing Sheets

(56) References Cited

U.S. PATENT DOCUMENTS

| | | | | |
|---|---|---|---|---|
| 2,609,710 | A * | 9/1952 | Osborn | F16H 57/021 |
| | | | | 475/246 |
| 3,545,568 | A * | 12/1970 | Lacoste | F16H 57/0421 |
| | | | | 184/6.12 |
| 4,004,472 | A * | 1/1977 | Millward | F16H 57/037 |
| | | | | 475/247 |
| 4,018,097 | A * | 4/1977 | Ross | F16H 57/037 |
| | | | | 74/467 |
| 4,244,242 | A * | 1/1981 | Uno | B60K 5/02 |
| | | | | 184/11.1 |
| 9,052,009 | B2 * | 6/2015 | Barillot | F16H 57/0409 |
| 10,539,225 | B2 * | 1/2020 | Nakano | F16H 57/0423 |
| 2014/0260790 | A1 | 9/2014 | Passino et al. | |
| 2018/0171838 | A1 * | 6/2018 | Maruyama | B60K 17/046 |
| 2020/0047613 | A1 * | 2/2020 | Eschenburg | B60K 17/36 |

* cited by examiner

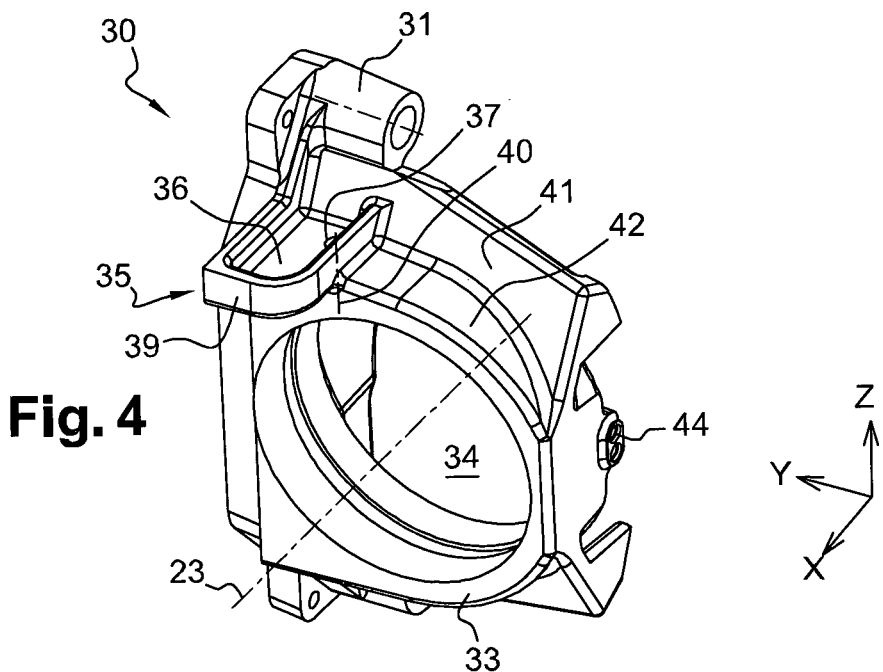
Fig. 4
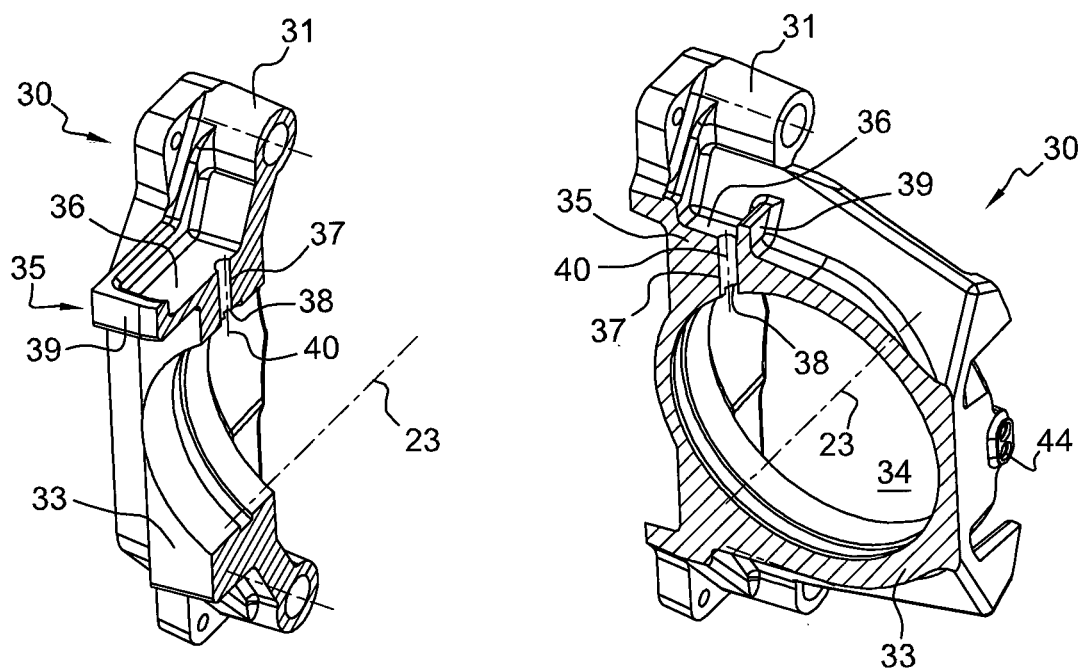
Fig. 5    Fig. 6

SUPPORTING DEVICE FOR A BEARING MOUNTED ON A DIFFERENTIAL HOUSING

BACKGROUND AND SUMMARY

The invention relates to a supporting device for a bearing mounted on the differential housing of a differential.

The invention also relates to an axle unit comprising such a supporting device, and to a vehicle comprising such an axle unit.

The invention can be applied in heavy-duty and medium-duty vehicles, such as tracks, buses and construction equipment. The invention can also applied on light duty vehicles such as passenger cars.

A vehicle such as a truck is generally equipped with one or several differentials on its driven axles.

A differential needs lubrication in order to prevent damages on its constituents; it is commonly lubricated by splash lubrication. More precisely, a differential comprises several pinions and gears connected via the differential housing to a crown wheel driven in rotation by an input shaft. The differential and the crown wheel are located in an axle housing which contains a lubricant bath. The lower part of the crown wheel is immersed in the lubricant bath so that, when the crown wheel rotates, it splashes the lubricant all over in the axle housing, thereby lubricating various parts of the system.

The amount of lubricant is a significant parameter for an appropriate operation of the system. On one hand, lubricant must be provided in a sufficiently large amount to ensure a satisfactory level of lubrication and heat dissipation. Lubrication and heat dissipation are achieved by means of splashing of the lubricant caused by the crown wheel rotation. On the other hand, the higher the lubricant amount in the housing, the higher the mechanical resistance against the crown wheel rotation (the lower is the efficiency) and the higher is the overall cost.

Besides, while the lubrication of several components located inside the axle housing can be achieved quite easily through the lubricant splashing caused by the crown wheel rotation, the lubrication of the differential itself—i.e. of the various gears and pinions—is more difficult insofar as the differential is surrounded by several constituents, such as the differential housing, and therefore is a difficult area to reach for the lubricant. This can be even more problematic when starting the vehicle.

It is desirable to provide a simple and efficient solution to ensure the lubrication of critical areas of a differential of a driven axle on a vehicle.

To that end, and according to a first aspect, the invention concerns a supporting device designed to be secured in the axle housing of an axle unit. The supporting device comprises a main portion being substantially in the shape of a ring or at least of half a ring and having a longitudinal axis, so as to form at least part of a circular opening intended to receive an outer ring of a bearing which, in use, is mounted on a differential housing of a differential that is arranged in said axle housing. The supporting device further comprises a collector capable of collecting lubricant projected, in use, inside the axle housing by at least one rotating part the collector comprising an outlet port for allowing lubricant to flow towards the longitudinal axis.

Owing to the collector, part of the lubricant which is projected inside the axle housing by a rotating part—in particular a crown wheel—is specifically collected for the lubrication of the differential itself, and subsequently guided towards the differential.

With a collector located on the supporting device itself, the area where the lubricant is collected is particularly appropriate, and the distance between the collecting area and the area to be lubricated is fairly low, ultimately resulting in a more efficient lubrication of the differential, a reduction in pressure losses and in the required amount of lubricant. Moreover, such a disposition results in a simpler structure requiring less constituents. Therefore, the invention provides a simple and efficient solution to ensure the lubrication of critical areas of a differential of a driven axle on a vehicle.

The supporting device can be in the form of a ring: in this case, the supporting device alone forms the circular opening receiving the bearing. Alternatively, the supporting device can be in the form of at least half a ring, but less than a complete ring: the supporting device then forms an arch which forms the circular opening together with a part of another piece having the shape of the remaining portion of the ring. Said other piece can be the housing, for example.

In practice, the supporting device can be secured to an inner face of the axle housing. It can further comprise linking portions designed to allow the supporting device to be secured in the axle housing.

By "in use" is meant the position that an element occupies when all parts are present and assembled to one another in the housing, and when the system is working.

According to an embodiment, the collector and the supporting device are separate parts, the collector being attached to the main portion of the supporting device.

According to another embodiment, the collector and the supporting device are made as a single piece. For example, the collector and the supporting device can be formed integrally by a moulding or casting process. This manufacturing process is advantageous in that it is simple and does not require additional mounting steps.

According to an embodiment and in use, the collector extends in the longitudinal direction from the main portion of the supporting device, towards a crown wheel that is attached to the differential housing. Owing to this feature, collecting lubricant is more effective.

Moreover, the collector can be offset with respect to the longitudinal axis along a first direction and a second direction which are orthogonal to the longitudinal axis and which are orthogonal to each other. In use, the first direction can be substantially transversal, i.e. horizontal and orthogonal to the longitudinal axis, while the second direction can be substantially vertical. This specific location of the collector takes into account the directions of the lubricant when it is projected inside the axle housing by the rotating part—in particular a crown wheel—to ensure a better collection of the projected lubricant at different rotation speeds of the crown wheel and especially at high rotation speeds of the crown wheel. Indeed, at high rotation speed of the crown wheel needs of the differential in term of lubrication are greater.

The supporting device may further comprise a reinforcing wall joining the collector and the main portion. More specifically, in an embodiment, such a reinforcing wall can join a side wall of the collector and a flange extending in a transverse plane from the main portion of the supporting device. Preferably, an outer face of the reinforcing wall is aligned with a bottom wall of the collector.

Thanks to this configuration, the collector contributes to reinforce the structure of the supporting device.

In an embodiment, the collector comprises:

a bottom wall that has a mean plane which is substantially horizontal in use and that includes a through hole, the lower end of which—in use—forms the outlet port;

a peripheral wall projecting from the periphery of the bottom wall;

the collector being open opposite the bottom wall.

The peripheral wall may comprise several side walls, one of said side walls being formed by a portion of a flange extending substantially in a transverse plane with respect to the longitudinal axis and from the main portion of the supporting device. By "transverse plane" is meant a plane which is orthogonal to the longitudinal axis. For instance, the bottom wall of the collector can be substantially planar, and horizontal in use. The bottom wall of the collector can be substantially rectangular. Thanks to that, the design of the collector is simplified.

The collector may be located above the longitudinal axis, in use, and the through hole may extend substantially along a direction orthogonal to the longitudinal axis, preferably along the vertical direction in use, to make a gravity flowing easier. The through hole axis may be offset with respect to the longitudinal axis, i.e. the through hole axis may not intersect the longitudinal axis.

The collector can define a collecting area which is at least 10 times greater than the outlet port section, to ensure efficient lubricant collection.

The collector can define a collecting area which is no greater than 50 times the outlet port section. This ensures the amount of lubricant collected is not higher than required. Besides, too big a collector could generate vibrations in use and could result in a difficult manufacturing and/or assembling process.

According to an embodiment, the supporting device comprises a base through which the supporting device can be secured to the housing, the collector being located on the supporting device near said base. As the base is usually a thicker part, this arrangement makes the integration or attachment of the lubricant collector easier and more robust in this area.

In an embodiment the peripheral wall of the collector comprises several side walls and one of said side walls extends from said base in a direction that is parallel to the longitudinal axis or is at least partially formed by said base. This arrangement further simplifies the integration of the lubricant collector and makes more robust the connection between the lubricant collector and the supporting device when they are made as a single piece.

According to a second aspect, the invention concerns an axle unit comprising an axle housing which contains a lubricant bath in use. The axle unit further comprises, inside the axle housing:

two drive shafts capable of being connected to wheels of a vehicle, outside the axle housing;

a crown wheel having a longitudinal axis, arranged to be driven in rotation around said longitudinal axis by an input shaft, and thus to project lubricant from the bath in which it soaks inside the axle housing;

a differential arranged substantially inside the crown wheel and comprising:

a differential housing to which the crown wheel is attached and in which are partially engaged the drive shafts;

inside the differential housing, differential side pinions connected, for instance, via a joint cross and the differential housing, to the crown wheel and two differential side gears each connected to at least one differential side pinion and to a drive shaft;

a bearing having an inner ring mounted on the differential housing, and an outer ring;

a supporting device as previously described, the supporting device being secured in the axle housing, the outer ring of the bearing being mounted in the circular opening formed at least partially by the supporting device main portion.

The bearing can typically be a conical bearing.

The axle unit may further comprise a nut having an outer thread and a central hole which has a diameter D61 and which is designed to receive one of the drive shafts. The nut is threaded in the circular opening formed at least partially by the supporting device main portion and is capable of pressing axially the outer ring of the bearing.

The nut may comprise at least one radial notch which is in fluid communication with the collector outlet port through an annular channel formed in the supporting device or in the nut.

In an embodiment, the nut comprises at least two, preferably at least four, radial notches which are substantially regularly spaced from each other along the periphery of the nut. Indeed, as the nut is used to provide a preload on the bearing, the angular position of the nut is not predetermined. Having at least two notches ensures that at least one notch is located not too far from the collector outlet port. Besides, having at least four notches further ensures that at least one notch is located in order to provide a path allowing the lubricant to flow towards the longitudinal axis by gravity.

The axle unit may also comprise a washer having a ring shape, the washer including a central hole which has a diameter D71 and which is designed to receive one of the drive shafts. The washer is mounted in the circular opening formed at least partially by the supporting device main portion, substantially adjacent the bearing on a side of the bearing which is opposite the differential, the outer diameter of the washer being greater than the inner diameter of the bearing outer ring so that the washer can cover the annular space existing between inner and outer rings of the bearing.

Thanks to this feature, the lubricant is prevented from flowing axially through the bearing, between the inner ring and the outer ring, which would result in the lubricant not reaching the differential to lubricate it.

According to an embodiment, the diameter D71 of the washer central hole is greater than the diameter D61 of the nut central hole, the washer being mounted between the bearing and the nut. This allows preventing the lubricant to flow axially away from the differential, through the nut central hole due to centrifugal effect resulting from rotation of the drive shaft.

According to an embodiment, an annular duct is formed between one of the drive shafts and the differential housing, said annular duct being in fluid communication with the inside of the differential and with the outlet port of the collector. Therefore, the lubricant collected in the collector can flow from the collector successively by the collector through hole, the collector outlet port, the annular channel formed in the supporting device (or in the nut), one radial notch arranged in the nut, the chamber located between the washer and the nut (i.e. the space inside the nut), the washer central hole, and the annular duct, towards the inside of the differential, that is to say towards the differential side pinions and the differential side gears of the differential.

According to a third aspect, the invention concerns a vehicle comprising at least such an axle unit. For example, said axle unit is at least one rear axle, the vehicle further comprising a front axle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4 is a perspective view of a supporting device forming part of the axle unit, the supporting device comprising a collector having an outlet port;

FIG. 5 shows the supporting device of FIG. 4 cut in a plane which is substantially vertical and longitudinal and which includes the outlet port;

FIG. 6 shows the supporting device of FIG. 4 cut in a plane which is substantially vertical and transversal and which includes the outlet port;

DETAILED DESCRIPTION

Figure 1:
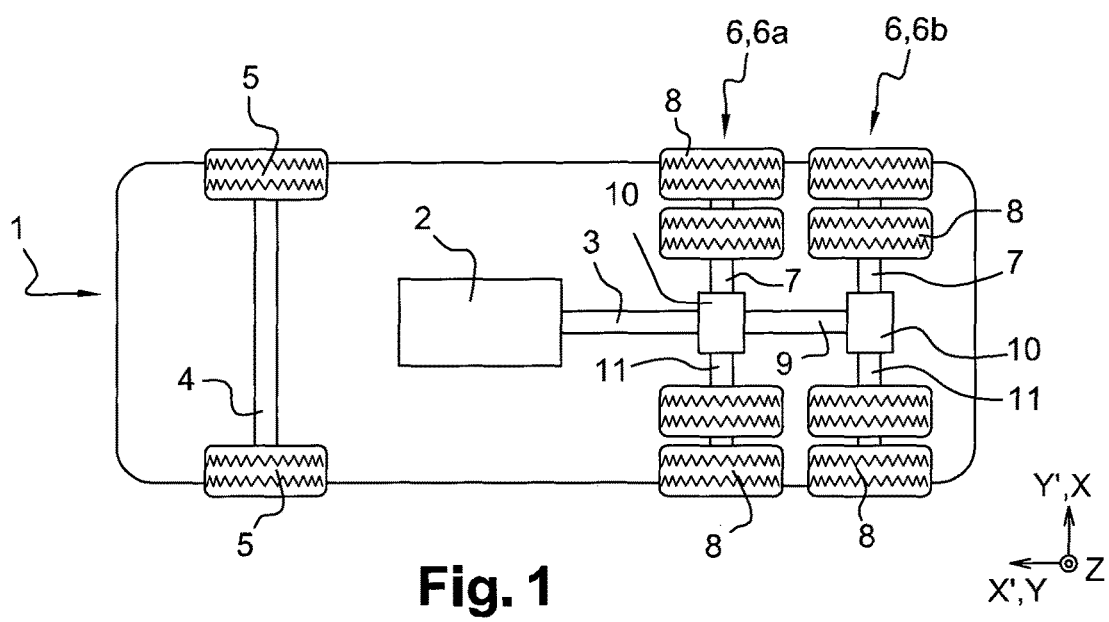
FIG. 1 is a schematic drawing of an example of an underside of a vehicle showing a rear axle including an axle unit according to an embodiment of the invention.

As shown in FIG. 1, a vehicle 1 comprises an engine 2 that drives an input shaft 3, and a front axle 4 connected to front wheels 5.

The vehicle 1 also comprises at least one rear axle unit 6. Each rear axle unit 6 comprises an axle housing 20 containing, in the central portion 10 of the axle housing 20, a differential 15 and containing two drive shafts 11 extending mainly inside tubular portions 7 of the axle housing 20. Tubular portions 7 extend on both sides of the central portion 10. The differential 15 comprises a differential housing 24 in which are arranged gearings 16, 18 of the differential. Each drive shaft 11 is partially engaged in the differential housing 24 and has a first end connected to the differential 15 and a second end connected to at least one wheel 8. In the illustrated embodiment, the vehicle 1 comprises a first driven rear axle unit 6a and a second driven rear axle unit 6b located rearwards from the first driven rear axle unit 6a, each rear axle 6a, 6b is connected to two wheels 8 on either side. An additional shaft 9 connects the input shaft 3 to the second driven rear axle unit 6b, through a transfer box that is preferably attached to the first driven rear axle unit 6a, and is tire input shaft for the second driven rear axle unit 6b.

Figure 2:
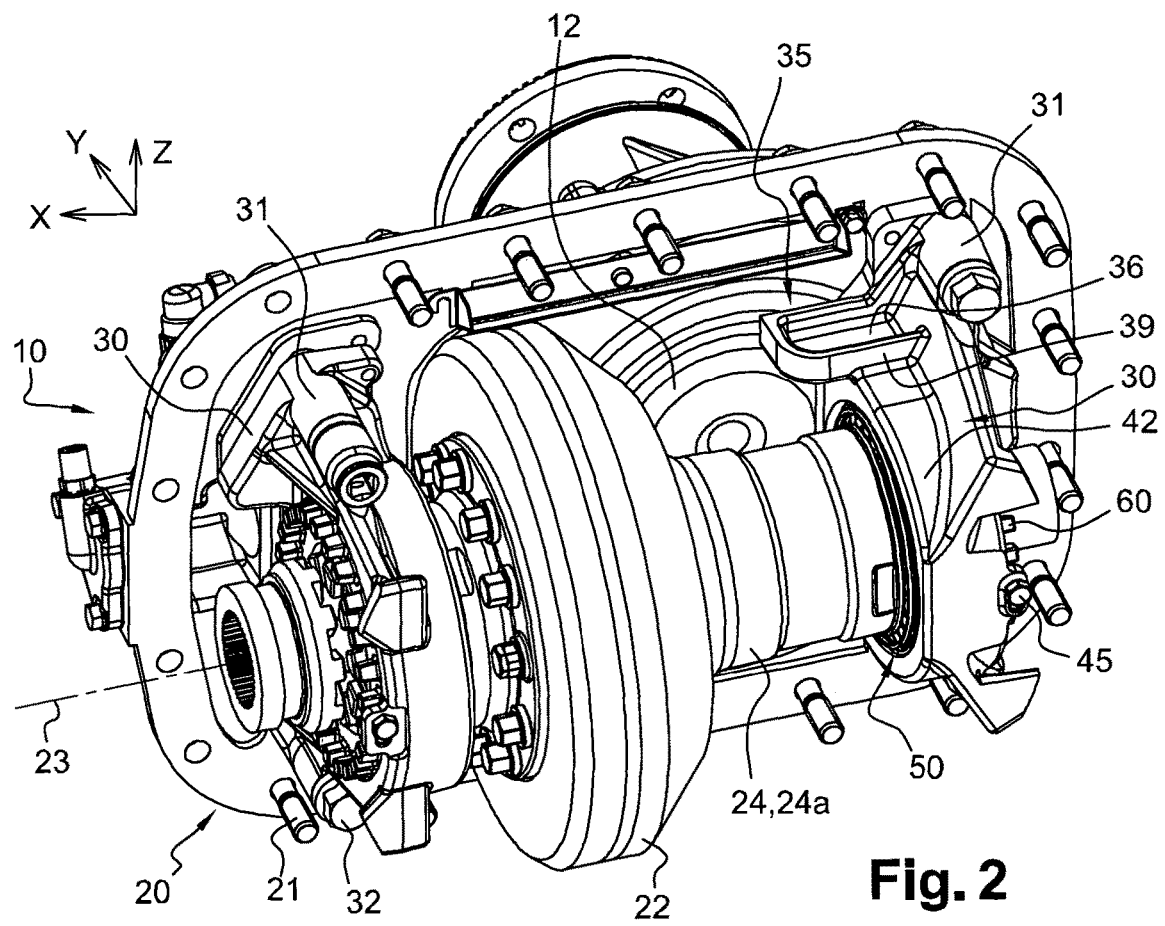
FIG. 2 is a perspective view of the axle unit, with part of the axle housing being removed.
Figure 3:
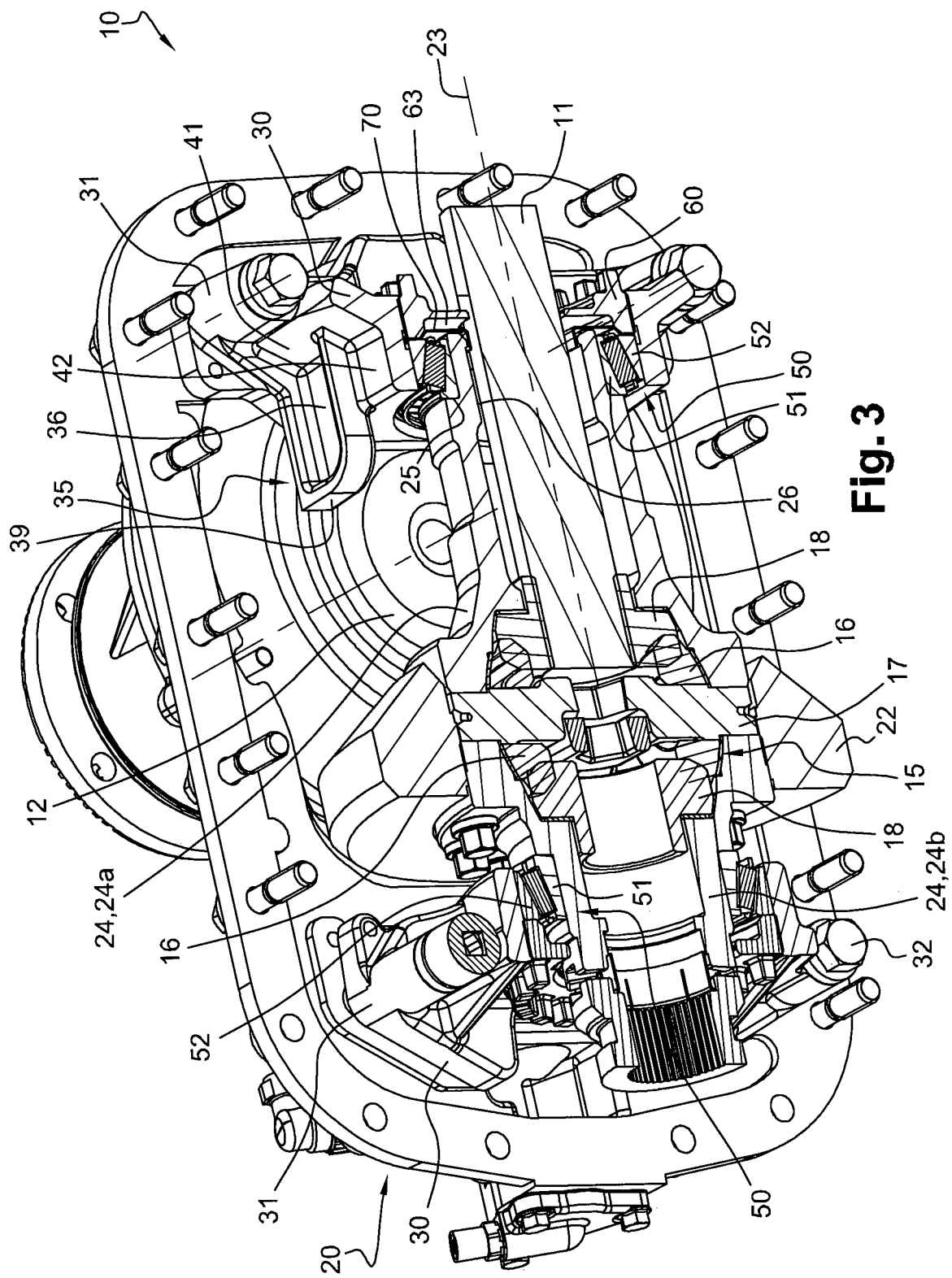
FIG. 3 is a perspective view of the axle unit of FIG. 2, cut in a plane which is substantially vertical and which includes a longitudinal axis of the axle unit.

With reference to FIGS. 2 and 3, the axle housing 20 of each rear axle unit 6, and more precisely the central portion 10 of the axle housing 20, can be made of two parts secured to one another by means of appropriate fasteners 21—for example two half shells of the central portion 10 secured along their peripheral edge by bolts. Except in FIG. 1, only one part of the axle housing 20 has been illustrated, so that the inside of said axle housing can be seen.

Inside the central portion 10 of the axle housing 20 is located a crown wheel 22 having a longitudinal axis 23. The crown wheel 22 is driven in rotation around said longitudinal axis 23 by the input shaft 3, by engagement of teeth arranged on a pinion 12 mounted on said input shaft 3 and teeth arranged on the crown wheel 22 (the teeth are not illustrated).

As shown in FIG. 2, the longitudinal direction X is defined as a direction parallel to the longitudinal axis 23 of the crown wheel 22. In the operating position, i.e. when the differential unit is mounted under the vehicle 1, as shown in FIG. 1, the longitudinal direction X corresponds the transverse direction Y' of the vehicle 1, i.e. the direction of the axles 4, 6. Direction X is substantially horizontal when the vehicle 1 is on a horizontal surface.

Besides, the transverse direction Y is defined as the direction which is orthogonal to the longitudinal direction X and substantially horizontal when the vehicle 1 is on a horizontal surface. Direction Y corresponds the longitudinal direction X' of the vehicle 1

Moreover, direction Z is defined as the vertical direction—when the vehicle 1 is on a horizontal surface.

The invention will be described when the vehicle 1 is on a horizontal surface.

Inside the crown wheel 22 is arranged the differential which comprises inside the differential housing 24 differential side pinions 16, for example four differential side pinions, which are fitted on a joint cross 17 that is attached to the differential housing 24 that forms in this case a differential carrier or that is directly attached to the crown wheel 22, and two differential side gears 18. Each differential side gear 18 meshes with at least one differential side pinion 16 and is fastened to a first end of one of the drive shafts 11.

The crown wheel 22 is secured to the differential housing 24. It may be made of two parts 24a, 24b each forming a sleeve around the corresponding drive shaft 11, said parts 24a, 24b may be fastened on both sides of the crown wheel 22. The crown wheel 22 can also be attached only on one part (24a or 24b) of the differential housing 24. In this case, both parts 24a, 24b are fastened together.

The crown wheel 22, differential 15, and differential housing 24 are rotating parts inside and with respect to the axle housing 20. They are mounted on the inner side of the axle housing 20 by means of two supporting devices 30. Each supporting device 30 is secured to the axle housing 20 and carries a bearing 50 having an inner ring 51 mounted on the differential housing 24, 24a, 24b and an outer ring 52 mounted on the supporting device 30. The supporting devices 30 are located on both sides of the crown wheel 22. The bearings 50 are preferably conical bearings.

The supporting device 30 can comprise a base 31 through which the supporting device 30 can be secured to the axle housing 20. In the illustrated embodiment, this base 31 comprises a connection interface and two cylindrical sleeves each receiving a fastener 32 such as a bolt.

Figure 7:
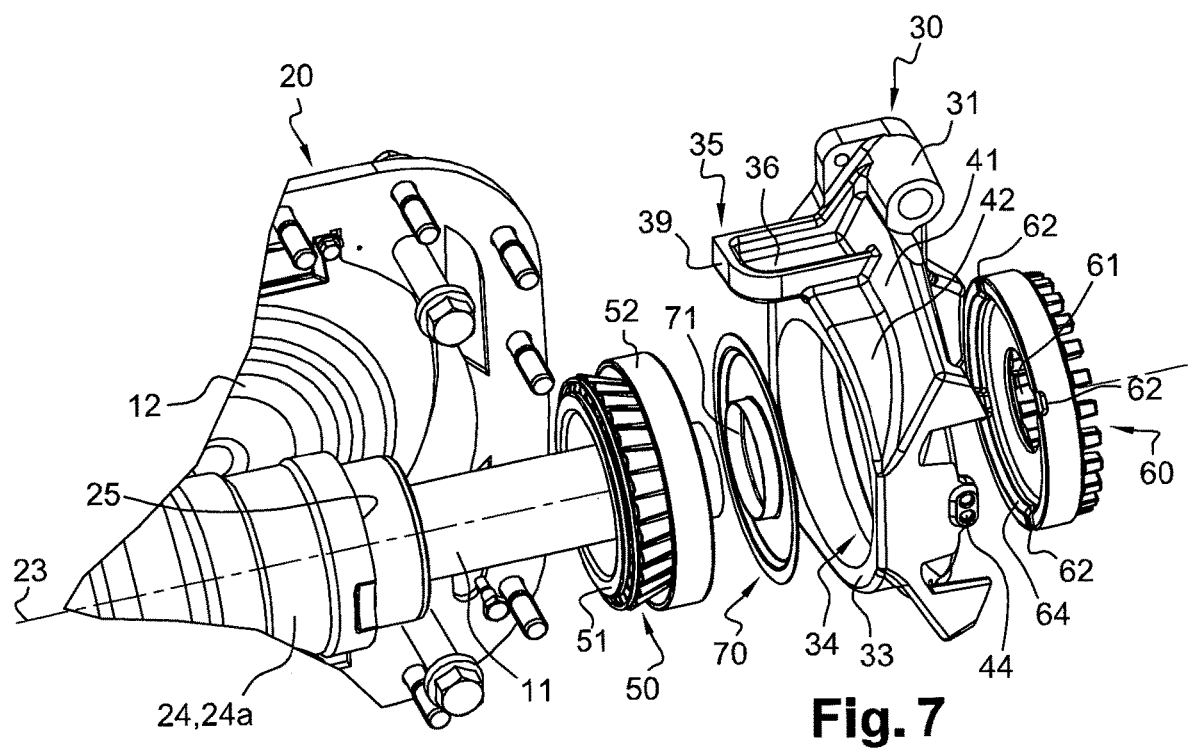
FIG. 7 is a detailed partial and exploded view of the axle unit showing the supporting device, a bearing, a nut and a washer.
Figure 8:
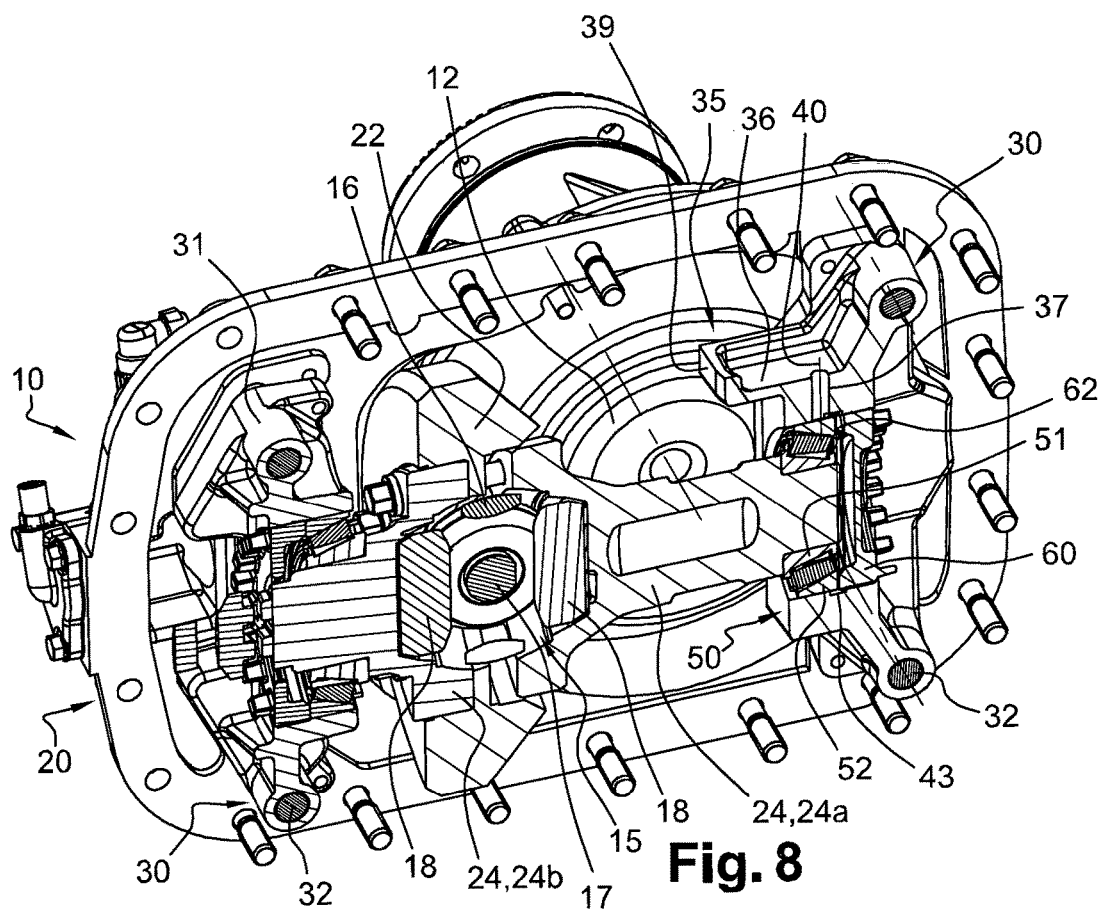
FIG. 8 is a perspective view of the axle unit of FIG. 2, cut in a plane which is substantially vertical and longitudinal and which includes the collector outlet port.

As best shown in FIG. 7, the supporting device 30 comprises a main portion 33. In the illustrated embodiment, this main portion 33 is substantially in the shape of a ring centered on the longitudinal axis 23, and forms a circular opening 34 in which is mounted the outer ring 52 of the bearing 50. According to another embodiment not shown, the main portion of the supporting device could have the shape of only part of a ring (such as an arch forming, substantially half a ring). The circular opening would then be formed in combination by said main portion and another part of the axle unit 6, such as a protruding portion of the axle housing 20.

In use, the axle housing 20, especially its central portion 10, contains a lubricant bath in which the crown wheel 22 soaks. When the crown wheel 22 is rotated, it projects lubricant from the bath inside the axle housing 20, 10 thanks to its teeth. Part of this projected lubricant directly contacts some constituents and therefore lubricate them. As will now be described, another part of this projected lubricant is used to specifically lubricate the differential 15, the constituent of which (especially the differential side pinions 16 and differential side gears 18) cannot be reached easily by the lubricant.

To achieve an efficient lubrication of the differential 15, the axle unit 6 is equipped with a collector 35 arranged on one of the supporting devices 30, said collector 35 being capable of collecting the lubricant projected inside the axle housing 20 by the crown wheel 22. The axle unit 6 is further equipped with an appropriate path to carry the lubricant flow from the collector 35 up to the inside of the differential to lubricate, for instance, the differential side pinions 16 and the differential side gears 18.

The collector 35 is preferably made as a single piece with the supporting device 30, typically by casting or moulding. However, alternatively, the collector 35 and the supporting device 30 could be made as separate parts subsequently secured to each other.

In the illustrated embodiment, the collector 35 comprises a bottom wall 36 having a mean plane which is substantially horizontal in use. For example, the bottom wall 36 can be substantially rectangular and planar. The bottom wall 36 includes a through hole 37 the lower end of which—in use—forms an outlet port 38 for allowing lubricant to flow towards the longitudinal axis 23. The collector 35 is open opposite the bottom wall 36

In this embodiment, the collector 35 further comprises a peripheral wall 39 projecting from the periphery of the bottom wall 36 and comprising several side walls. For example, with a rectangular bottom wall 36, the peripheral wall 39 may comprise two longitudinal side walls each extending in a plane (X,Z) and two transverse side walls each extending in a plane (Y,Z) One of said side walls, preferably one of the transverse side walls, can be formed by a portion of a flange 41 extending substantially in a transverse plane (Y,Z) from the main portion 33 of the supporting device 30. Due to this arrangement, the design of the collector is simplified.

As shown in the figures, the collector 35 can extend, in use, in the longitudinal direction X from the main portion 33 of the supporting device 30, towards the crown wheel 22 that is attached to the differential housing 24. As the collector 35 thus forms a protruding element, a reinforcing wall 42 may be provided to join the collector 35 and the main portion 33 or the flange 41 of the supporting device 30. Preferably, an outer face of the reinforcing wall 42 is aligned with the bottom wall 36 of the collector 35.

The collector 35 can be offset with respect to the longitudinal axis 23. More specifically, the collector 35 can be located on the supporting device 30 near to the base 31, which generally is a thicker and thus stronger part of the supporting device 30. Preferably, when the collector 35 is made as a single piece with the supporting device 30, a longitudinal side wall of the peripheral wall 39 extends from the base 31 or is partially formed by the base 31. This arrangement further simplifies the design of the collector.

As shown in FIG. 4, the collector 35 can be offset with respect to the longitudinal axis 23 both along the Y axis and the Z axis.

As a result, the through hole 37 is also offset with respect to the longitudinal axis 23 both along the Y axis and the Z axis (see FIGS. 5 and 6). Preferably, in order to take advantage of gravity, the collector 35 can be located above the longitudinal axis 23 in the Z direction. The through hole 37 can have an axis 40 which extends substantially along a direction orthogonal to the longitudinal axis 23, for example along the Z direction.

Figure 9:
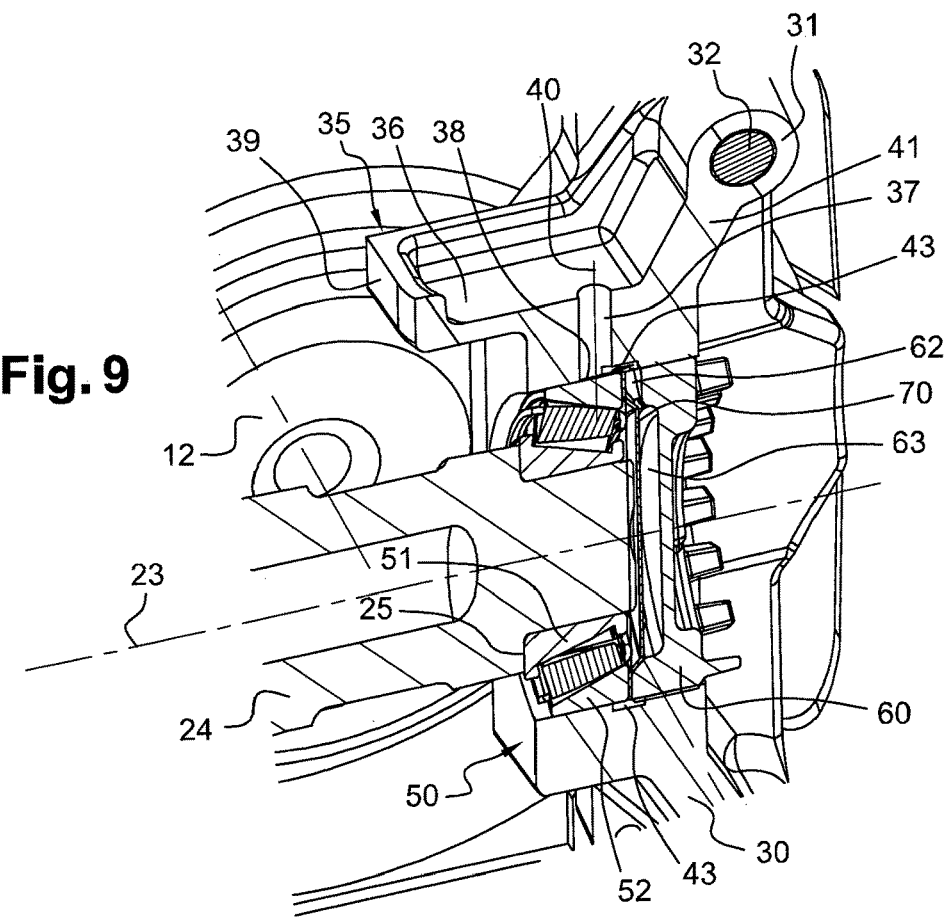
FIG. 9 is a detailed view of FIG. 8.
Figure 10:
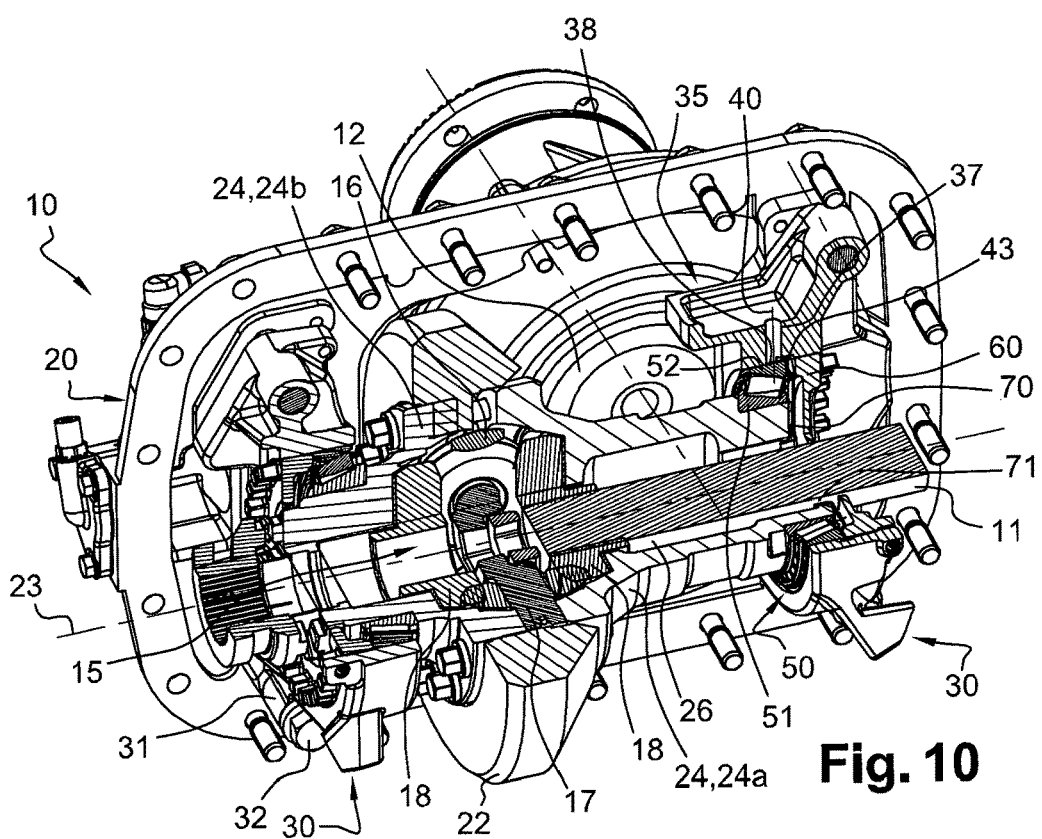
FIG. 10 shows the supporting device of FIG. 4 cut in two orthogonal planes both including the longitudinal axis.

As best shown on FIGS. 7 and 9, the axle unit 6 further comprises a nut 60 having an outer thread (not shown), in order to be threaded in the circular opening 34 of the supporting device 30. The nut 60 has a central hole 61 which has a diameter D61 and which is designed to receive the drive shaft 11. The nut 60 also comprises a collar 64 extending, in use, towards the differential 15 and several radial notches 62, for example four radial notches 62 which are substantially regularly spaced from each other along the periphery of the nut 60, and which extend over the whole radial thickness of the collar 64.

The axle unit 6 further comprises a washer 70 having a ring shape. The washer 70 has an outer diameter D70 which is greater than the inner diameter of the outer ring of the bearing 50 so that the washer can cover the annular space existing between the inner and outer rings 51, 52 of the bearing.

The washer 70 includes a central hole 71 which has a diameter D71 and which is designed to receive the drive shaft 11. The diameter D71 of the washer central hole 71 is greater than the diameter D61 of the nut central hole 61.

In practice, the bearing 50 is mounted around the differential housing 24, the inner ring 51 resting against a radial shoulder 25 arranged on the differential housing 24, and facing opposite the differential 15. The washer 70 is mounted in the circular opening 34 of the supporting device 30, substantially adjacent the bearing 50, on the side of the bearing 50 opposite the shoulder 25. As the outer diameter D70 of the washer 70 is in practice equal to or greater than the outer diameter of the bearing 50, the washer 70 can cover said bearing side.

Moreover, the nut 60 is mounted in the circular opening 34 of the supporting device 30, on the side of the washer 70 which is opposite the bearing 50. The nut 60 is threaded with respect to the circular opening 34, i.e. rotated, so as to provide an appropriate preload—i.e. axial pressure—on the outer ring 52 of the bearing 50. In other words, the bearing 50 is pushed against the shoulder 25 by the nut 60, and the washer 70 is sandwiched between the bearing 50 and the nut 60. The nut 60 is maintained in this position by means of appropriate fasteners 45 that can be for example inserted through holes 44 of the supporting device 30.

The path followed by the lubricant which has been projected by the crown wheel 22, from the collector 35 in which it has been collected, towards the differential 15, will now be described.

The lubricant flows by gravity by the through hole 37 of the collector 35 and comes out by the outlet port 38. The outlet port 38 may be located facing the outer ring 52 of the bearing 50, which prevents the lubricant from flowing further along the vertical direction Z.

The lubricant then enters an annular channel 43 formed in the supporting device 30, said annular channel 43 being in fluid communication with the through hole 37 and extending axially opposite the bearing 50 up to the notches 62 of the nut 60. Thus, the lubricant enters one of the notches 62 and comes out in the inner space of the nut 60. The lubricant is located in a chamber 63 formed inside the circular opening 34 of the supporting device 30, between the washer 70 and the nut 60 (see FIG. 9).

As the diameter D71 of the washer central hole 71 is greater than the diameter D61 of the nut central hole 61, the lubricant flows through the washer central hole 71 (see FIG.

10). The lubricant then enters an annular duct 26 which is formed between the drive shaft 11 and the differential housing 24, and can flow up to the inside of the differential 15 in order to reach the differential side pinions 16 and differential side gears 18 and lubricate them.

Therefore, the invention provides a very efficient lubrication system which does not require a great amount of lubricant, owing to the specific location of a lubricant collector and to the guiding path of the collected lubricant towards the inner components of the differential.

It is to be understood that the present invention is not limited to the embodiments described above and illustrated in the drawings; rather, the skilled person will recognize that many changes and modifications may be made within the scope of the appended claims.

The invention claimed is:

1. A supporting device designed to be secured in an axle housing of an axle unit, the supporting device comprising a main portion being substantially in the shape of a ring or at least of half a ring and having a longitudinal axis, so as to form at least part of a circular opening intended to receive an outer ring of a bearing which, is mounted on a differential housing of a differential that is arranged in the axle housing wherein the supporting device further comprises a collector capable of collecting lubricant projected, in use, inside the axle housing by at least one rotating part, the collector extends in the longitudinal direction from the main portion of the supporting device, towards a crown wheel attached to the differential housing, the collector comprising an outlet port for allowing lubricant to flow towards the longitudinal axis.

2. The supporting device according to claim 1, wherein the collector and the supporting device are separate parts, the collector being attached to the main portion of the supporting device.

3. The supporting device according to claim 1, wherein the collector and the supporting device are made as a single piece.

4. The supporting device according to claim 3, wherein the collector comprises a bottom wall that has a mean plane which is substantially horizontal in use and that includes a through hole, the lower end of which forms the outlet port; a peripheral wall projecting from the periphery of the bottom wall; the collector being open opposite the bottom wall; the supporting device comprising a base through which the supporting device can be secured in the axle housing, and in that the collector is located on the supporting device near the base; wherein the peripheral wall comprises several side walls and one of the side walls extends from the base in a direction that is parallel to the longitudinal axis or is at least partially formed by the base.

5. The supporting device according to claim 1, wherein the collector is offset with respect to the longitudinal axis along a first direction (Y) and a second direction which are orthogonal to the longitudinal axis and are orthogonal to each other.

6. The supporting device according to claim 1, further comprising a reinforcing wall joining the collector and the main portion, wherein the reinforcing wall has an outer face that is aligned with a bottom wall of the collector.

7. The supporting device according to claim 1, wherein the collector comprises: a bottom wall that has a mean plane which is substantially horizontal and that includes a through hole, the lower end of which forms the outlet port; a peripheral wall projecting from the periphery of the bottom wall; the collector being open opposite the bottom wall.

8. The supporting device according to claim 7, wherein the peripheral wall comprises several side walls, one of the side walls being formed by a portion of a flange extending substantially in a transverse plane with respect to the longitudinal axis and from the main portion of the supporting device.

9. The supporting device according to claim 7, wherein the collector is located above the longitudinal axis, and in that the through hole extends substantially along a direction orthogonal to the longitudinal axis.

10. The supporting device according to claim 1, wherein the collector defines a collecting area for the lubricant which is at least 10 times greater than the outlet port.

11. The supporting device according to claim 1, wherein the collector defines a collecting area for the lubricant which is no greater than 50 times the outlet port.

12. The supporting device according to claim 1, further comprising a base through which the supporting device can be secured in the axle housing, and in that the collector is located on the supporting device near the base.

13. An axle unit comprising an axle housing which contains a lubricant bath in use, the axle unit further comprising, inside the axle housing: two drive shafts capable of being connected to wheels of a vehicle, outside the axle housing; a crown wheel having a longitudinal axis, arranged to be driven in rotation around the longitudinal axis by an input shaft, and thus to project lubricant from the bath in which it soaks inside the axle housing; a differential arranged substantially inside the crown wheel and comprising: a differential housing to which the crown wheel is attached and in which are partially engaged the drive shafts, inside the differential housing, differential side pinions connected, via a joint cross and the differential housing, to the crown wheel and two differential side gears each connected to at least one differential side pinion and to a drive shaft; a bearing having an inner ring mounted on the differential housing, and an outer ring; wherein the axle unit further comprises a supporting device according to claim 1, the supporting device being secured in the axle housing, the outer ring of the bearing being mounted in the circular opening formed at least partially by the supporting device main portion.

14. The axle unit according to claim 13, further comprising a nut having an outer thread and a central hole which has a diameter and which is designed to receive one of the drive shafts, the nut being threaded in the circular opening formed at least partially by the supporting device main portion and being capable of pressing axially the outer ring of the bearing.

15. The axle unit according to claim 14, wherein the nut comprises at least one radial notch which is in fluid communication with the collector outlet port through an annular channel formed in the supporting device or in the nut.

16. The axle unit according to claim 15, wherein the nut comprises at least two, preferably at least four, radial notches which are substantially regularly spaced from each other along the periphery of the nut.

17. The axle unit according to claim 14, further comprising a washer having a ring shape, the washer including a central hole which has a diameter and which is designed to receive one of the drive shafts, the washer being mounted in the circular opening formed at least partially by the supporting device main portion, substantially adjacent the bearing on a side of the bearing which is opposite the differential, the outer diameter of the washer being greater than the inner diameter of the bearing outer ring so that the washer can cover the annular space existing between the inner and outer rings of the bearing, wherein the diameter of the washer central hole is greater than the diameter of the nut central hole, the washer being mounted between the bearing and the nut.

18. The axle unit according to claim 13, further comprising a washer having a ring shape, the washer including a central hole which has a diameter and which is designed to receive one of the drive shafts, the washer being mounted in the circular opening formed at least partially by the supporting device main portion, substantially adjacent the bearing on a side of the bearing which is opposite the differential, the outer diameter of the washer being greater than the inner diameter of the bearing outer ring so that the washer can cover the annular space existing between the inner and outer rings of the bearing.

19. The axle unit according to claim 13, wherein an annular duct is formed between one of the drive shafts and the differential housing, the annular duct being in fluid communication with the inside of the differential and with the outlet port of the collector.

20. A vehicle comprising at least one axle unit according to claim 13.

\* \* \* \* \*